United States Patent
Li et al.

(10) Patent No.: US 9,798,929 B2
(45) Date of Patent: Oct. 24, 2017

(54) REAL-TIME POSE ESTIMATION SYSTEM USING INERTIAL AND FEATURE MEASUREMENTS

(71) Applicant: The Regents of the University of California, Oakland, CA (US)

(72) Inventors: Mingyang Li, Riverside, CA (US); Anastasios Mourikis, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/179,631

(22) Filed: Jun. 10, 2016

(65) Prior Publication Data

US 2017/0061195 A1 Mar. 2, 2017

Related U.S. Application Data

(62) Division of application No. 14/279,123, filed on May 15, 2014, now abandoned.

(60) Provisional application No. 61/824,309, filed on May 16, 2013.

(51) Int. Cl.
    *G06K 9/00*      (2006.01)
    *G06K 9/46*      (2006.01)

(52) U.S. Cl.
    CPC ....... *G06K 9/0063* (2013.01); *G06K 9/00664* (2013.01); *G06K 9/4671* (2013.01)

(58) Field of Classification Search
    CPC ............. H04N 5/23238; G06K 9/3241; G06K 9/6218; G06K 9/0063; G06K 9/4671; G06K 9/00664; G06K 9/6255; G06K 9/00369
    USPC .................................. 382/160, 103; 348/36
    See application file for complete search history.

(56) References Cited

U.S. PATENT DOCUMENTS

| | | |
|---|---|---|
| 2008/0065267 A1 | 3/2008 | Hong et al. |
| 2009/0248304 A1 | 10/2009 | Roumeliotis et al. |
| 2014/0160229 A1 | 6/2014 | Djugash |
| 2014/0195148 A1 | 7/2014 | Erignac et al. |

OTHER PUBLICATIONS

Anastasios I. Mourikis, et al., "A Multi-State Constraint Kalman Filter for Vision-aided Inertial Navigation," IEEE International Conference on Robotics and Automation, Roma, Italy, Apr. 10-14, 2007, pp. 3565-3572.
Anastasios I. Mourikis, et al., "A Dual Layer Estimator Architecture for Long-term Localization," IEEE, 2008, 8 pages.
Brian Williams, et al., "Feature and Pose Constrained Visual Aided Inertial Navigation for Computationally Constrained Aerial Vehicles," IEEE International Conference on Robotics and Automation, Shanghai International Conference Center, Shanghai, China, May 9-13, 2011, pp. 431-438.

*Primary Examiner* — Ruiping Li
(74) *Attorney, Agent, or Firm* — Cislo & Thomas, LLP (57) ABSTRACT

A hybrid estimator system using visual and inertial sensors for real-time pose tracking on devices with limited processing power using at least one processor, a memory, a storage and communications through a protocol and one or more than one software module for a hybrid estimator, real-time algorithm selection to process different measurements, statistical learning for these characteristics to compute the expected device computing cost of any strategy for allocating measurements to algorithms, and algorithm selection based on the statistical learning module.

10 Claims, 7 Drawing Sheets

REAL-TIME POSE ESTIMATION SYSTEM USING INERTIAL AND FEATURE MEASUREMENTS

CROSS-REFERENCE TO RELATED APPLICATIONS

This application is a divisional of U.S. patent application Ser. No. 14/279,123, filed May 15, 2014, which claims the benefit under 35 U.S.C. §119(e) of U.S. Provisional Patent Application Ser. No. 61/824,309, filed on May 16, 2013, the contents of which are incorporated herein by reference in their entirety.

FIELD OF THE INVENTION

The present invention relates to real-time pose tracking, and more specifically to a hybrid estimator system using visual and inertial sensors for real-time pose tracking on devices with limited processing power.

BACKGROUND

Currently, there are no adequate solutions to the problem of tracking the 3D-pose of small, resource-constrained systems in unknown environments. Specifically, estimating the motion of miniature devices, similar in size to a mobile phone, is difficult. In contrast to medium and large-scale systems, (e.g. mobile robots, UAVs, autonomous cars), small devices have limited computational capabilities and battery life, factors which make the pose-estimation problem challenging. In the absence of GPS, the types of sensors that can be used for pose estimation in small-scale systems are quite restricted.

A key challenge in designing an estimator for this task is the limited availability of processing power. Feature detection algorithms can track hundreds of features in images of natural scenes, but processing all this data in real time is challenging, particularly for a small, resource-constrained device.

Additional difficulties arise when designing an estimator for any localization task. The computational efficiency of different methods depends strongly on the nature of each particular dataset. For instance, one algorithm may outperform all others when the environment is feature-rich and the vehicle is moving slowly, while a different algorithm may be the fastest in feature-sparse environments under fast motion. This makes algorithm selection a difficult task, for which no general, systematic methods exist to date.

A huge number of methods have been proposed for pose estimation, however, existing methods typically consist of a single approach for processing the feature measurements (e.g., EKF-based SLAM, or sliding-window iterative minimization). As a result, they often do not generalize well to different environments, and are difficult to adapt to the varying availability of computational resources.

Therefore there is a need for a hybrid-estimator system using visual and inertial sensors for real-time pose tracking on devices with limited processing power.

SUMMARY

The present invention solves the problems of the prior art by providing a hybrid estimator system using sensors for real-time pose tracking of moving platforms. The system has a device with a processor, memory, storage and communications through a protocol to execute one or more than one software module. The software modules comprise code executable on the processor for executing the hybrid estimator that uses a plurality of algorithms for processing measurements and selecting the constituent algorithms of the hybrid estimator used to process each measurement.

The system uses a module with non-statutory instructions for learning the statistical characteristics of the measurements and the algorithm selection is based on the learning module. The system gathers information to compute the expected cost of strategies for processing measurements by different algorithms to reduce the computational requirements. These computations are solved by the system in real time. The system solves an optimization problem with an objective function representing the expected computation time to identify the preferred strategy.

The hybrid estimator can then estimate a moving platform's trajectory using inertial measurements and the observations of features by one or more than one sensors or by using inertial measurements and the observations of features by a visual sensor.

The system of claim 1, where the system comprises non-transitory instructions to process each of the available feature measurements, where the feature measurements can be processed by including a description of the features as variables to be estimated in the hybrid estimator. Feature measurements can also be processed by using obtained observations in order to derive constraints, directly used for updating the pose estimates of the moving object.

The system has non-transitory instructions to improve the accuracy of the pose estimates, reduce the computational requirements of the estimator or both improve the accuracy of the pose estimates and reduce the computational requirements of the estimator during system operation to reduce the processing requirements.

The hybrid estimator has non-transitory instructions to determine which of the plurality of methods is to be used for processing each of the feature measurements to reduce the computational requirements of the estimator and to adapt the system to the characteristics of the environment, the trajectory of the moving object, and the availability of processing resources. The hybrid estimator determines the number of features that should be extracted from raw sensor data in order to adjust to the availability of computational resources.

The hybrid estimator constructs linearized approximations of the nonlinear mathematical models that describe the motion and the sensor measurements in order to compute a description of the uncertainty of the estimates, where the linearization points are selected to preserve the system's observability properties. A unique estimate of certain states is used in order to compute the linearization matrices for all measurement equations that involve each of the states. The estimates of one or more than one state is used to compute the linearization matrices and can be modified by equal amounts, to reduce linearization inaccuracy while preserving the system's observability properties.

The hybrid estimator can also implement a hybrid extended Kalman filter. The hybrid extended Kalman filter comprises an extended-Kalman filter algorithm that includes feature states in the state vector, and a sliding-window extended-Kalman-filter algorithm that includes states of the mobile platform in the state vector. The size of the sliding window is selected to reduce the computational cost of the hybrid extended Kalman filter. The hybrid estimator module determines the choice of algorithm to process each individual feature depending on the distribution of the feature track lengths of features. The hybrid estimator also determines the optimal strategy for processing the feature measurements by solving a one-variable optimization problem using the information above and processes all available measurements without loss of localization information.

The plurality of algorithms, employ an extended Kalman filter, must have bounded computational complexity, irrespective of the duration of the trajectory. The hybrid estimator also includes an extended Kalman filter-sliding-window iterative minimization algorithm, where the state vector contains a current IMU state as well as representations of the feature positions. Features that leave the field of view are removed from the state vector leaving only the currently observed ones, to keep the computations bounded. The hybrid estimator has other extended-Kalman-filter algorithms that maintain a sliding window of camera poses in the state vector, and use the feature observations to apply probabilistic constraints between these poses. One of the other extended Kalman filter is a multistate-constraint Kalman filter.

The algorithm used to process feature measurements is selected to have the lowest computational cost. The hybrid filter is a combination of both the extended Kalman filter-sliding-window iterative minimization and the multistate-constraint Kalman filter algorithms. The hybrid filter is a filter whose state vector contains the current IMU state, m camera poses, and sk features, and determines whether a feature will be processed using the multistate-constraint Kalman filter algorithm, or whether it will be included in the state vector and processed using the extended Kalman filter-sliding-window iterative minimization algorithm.

Also provided is method for using a hybrid estimator with visual and inertial sensors for real-time pose tracking on devices with limited processing power. First, a method to be used by the system for processing each of the feature measurements is determined. Then, the system is adapted to the characteristics of the environment, the trajectory of the moving object, and the availability of processing resources. Next, the number of features to be extracted from raw sensor data is determined in order to adjust to the availability of computational resources. Finally, linearized approximations of the nonlinear mathematical models that describe the motion and the sensor measurements are constructed.

Additionally, a method for making a hybrid estimator using visual and inertial sensors for real-time pose tracking on devices with limited processing power. First, a device comprising at least one processor, a memory, a storage and communications through a protocol is provided. Next, one or more than one software module is provided. The software one or more than one module are communicatively coupled to each other. The software modules provide a hybrid estimator, real-time algorithm selection to process different measurements, statistical learning for these characteristics to compute the expected device computing cost of any strategy for allocating measurements to algorithms, and algorithm selection based on the statistical learning module.

The method above also propagates the state vector and covariance matrix using the IMU readings, determines when camera measurements and features are available, augments the state vector with the latest camera pose, determines if the features are to be processed using an multistate-constraint Kalman filter algorithm, computing residuals and measurement Jacobian matrices, and form the residual and Jacobian matrix Hk for features that are included in the state vector, update the state vector and covariance matrix using the residual and Jacobian matrix Hk, and initialize features tracked in all images of the sliding window, updating state management and removing the oldest camera poses from the state vector.

If the features are to be processed using an multistate-constraint Kalman filter algorithm, then the method calculates a residual and Jacobian matrix for each feature to be processed, performs a Mahalanobis gating test, and forms a residual vector and a Jacobian matrix using all features that passed the gating test.

State management is updated by removing sliding-window iterative minimization features that are no longer tracked and changing the anchor pose for sliding-window iterative minimization features anchored at the oldest pose.

In addition, the method can also analyze the computations needed for the hybrid estimator and calculate the number of floating-point operations per update of the hybrid algorithm.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention solves the limitations described above by providing a new paradigm for the design of motion estimation algorithms. Specifically, the system uses a hybrid estimator that incorporates a one or more than one of algorithms with different computational characteristics. The system determines, in real time, the algorithm by which to process different measurements (e.g., different features). Because the preferred choice for each measurement will depend on the characteristics of sensor data, the system can employ statistical learning of these characteristics. In one embodiment, the system gathers statistical information to compute the expected cost of any strategy for allocating measurements to algorithms. To identify the preferred strategy, the system solves, in real time, an optimization problem with an objective function of the expected computation time.

The system uses visual and inertial measurements, because cameras and inertial measurement units (IMUs) are small, lightweight, and inexpensive sensors that can operate in almost any environment. The system estimates a moving platform's trajectory using the inertial measurements and the observations of naturally occurring point features. The system does not assume that a map of the area is available.

The present invention overcomes limitations of the prior art by providing a hybrid estimator system using visual and inertial for real-time pose tracking on devices with limited processing power. The system uses a novel procedure and method for estimating the state (e.g., the position, orientation, velocity) of a moving object (e.g., a vehicle, handheld device, aircraft) by combining data from an inertial sensor and one or more than on additional sensors that provide feature measurements. One key advantage of the method is the use of one or more than one different approaches for the processing of the feature measurements. The method used to process each of the available feature measurements is determined during system operation to improve the accuracy of the pose estimates and/or reduce the computational requirements of the estimator. In one embodiment, the method is executed for pose estimation using measurements from an inertial sensor and from a camera that observes "features" (e.g., points of interest) in the scene. The feature measurements can be processed by (i) explicitly including them as variables to be estimated in the estimator, or (ii) using their observations in order to derive constraints, directly used for updating the pose estimates of the moving object.

There is also provided a method to determine which of the methods should be used by the system for processing each of the feature measurements. This is used to reduce the computational requirements of the estimator and to adapt the system to the characteristics of the environment, the trajectory of the moving object, and the availability of processing resources.

Additionally, in one embodiment the system uses an adaptive approach to determining the number of features that should be extracted from raw sensor data in order to adjust to the availability of computational resources.

Finally, in order to compute an accurate description of the uncertainty of the estimates, the method employs suitably constructed linearized approximations of the nonlinear mathematical models that describe the motion and the sensor measurements. By choosing linearization points that preserve the system's observability properties, the system obtains high-precision, consistent estimates for the state of the moving object, at low computational cost.

Additionally, two other research papers by the inventors "*Improving the Accuracy of EKF-Based Visual-Inertial Odometry*" and "*Vision-aided Inertial Navigation for Resource-constrained Systems*" by Mingyang Li and Anastasios Mourikis that are hereby incorporated by reference in their entirety.

All dimensions specified in this disclosure are by way of example only and are not intended to be limiting. Further, the proportions shown in the Figures are not necessarily to scale. As will be understood by those with skill in the art with reference to this disclosure, the actual dimensions and proportions of any system, any device or part of a system or device disclosed in this disclosure will be determined by its intended use.

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments can be implemented by hardware, software, firmware, middleware, microcode, or a combination thereof. When implemented in software, firmware, middleware or microcode, the program code or code segments to perform the necessary tasks can be stored in a machine-readable medium such as a storage medium or other storage(s). One or more than one processor can perform the necessary tasks in series, concurrently, distributed or in parallel. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, wireless transmission, etc.

The software identified above can also be constructed as a module. The module is a logically self-contained and discrete part of a larger computer program, for example, a subroutine or a co-routine. Modules are typically incorporated into the program through interfaces. The module interface expresses the elements that are provided and required by the module. The elements defined in the interface are detectable by other modules. The implementation contains the executable code that corresponds to the elements declared in the interface. Modules perform logically discrete functions. The module can interact with other modules of the system to achieve its purpose.

In the following description, certain terminology is used to describe certain features of one or more embodiments of the invention.

The term "visual-inertial odometry" refers to using inertial measurements from an IMU and the observations of naturally occurring point features from a visual sensor (e.g., a camera) to estimate the pose of a moving object in an environment without the use of a map.

Figure 1:
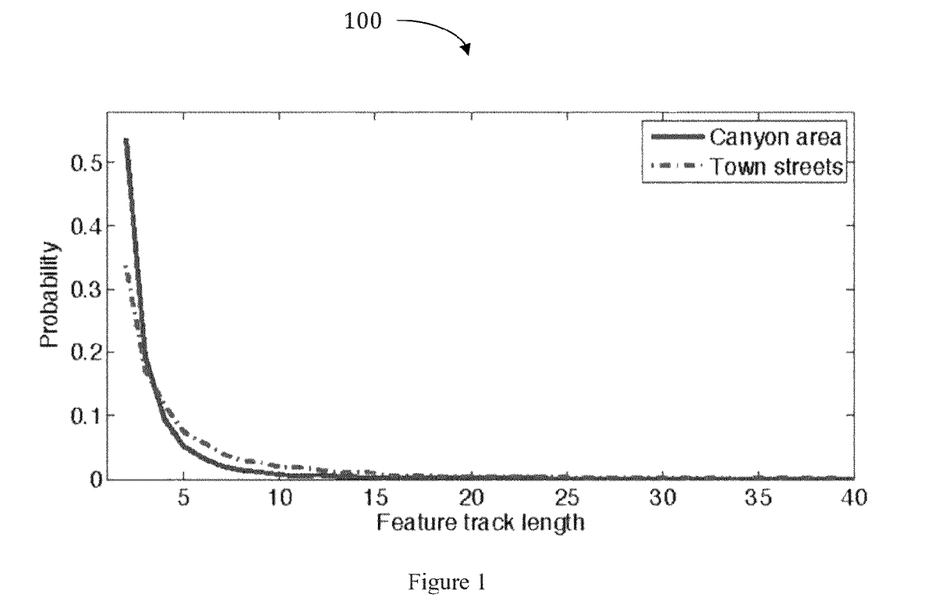
FIG. 1 is a diagram showing a distribution of feature track lengths in a data set.

Referring now to FIG. 1, there is shown a diagram 100 showing distributions of feature track lengths in a data set. The system uses visual-inertial odometry to solve problems in the prior art. Specifically, the system uses a hybrid extended Kalman filter (EKF), that integrates an extended Kalman filter for simultaneous localization and mapping (EKF-SLAM) with a sliding-window EKF estimator. As explained herein, these two estimators process the measurement information in different ways, and have different computational characteristics.

In one embodiment, the system determines the choice of algorithm to process each individual feature depending on the distribution of the feature track lengths of all features. The distribution is not known in advance, because it depends on the environment, the camera motion, as well as the feature tracker used, and therefore the system learns it from an image sequence. Using this information, the optimal strategy for processing the feature measurements can be computed by solving a one-variable optimization problem. Results demonstrate that the hybrid algorithm outperforms each individual method (EKF-SLAM and sliding-window EKF) by a wide margin. In fact, the hybrid filter allows processing the sensor data at real-time speed on a mobile phone, something that is not possible with either of the individual algorithms. Using the present invention, all the available measurements are processed, and no localization information is lost.

Since real-time performance is necessary, any candidate algorithm for the system must have bounded computational complexity, irrespective of the duration of the trajectory. Within this class, practically all algorithms proposed to date employ either an EKF, or iterative minimization over a window of states. The latter approaches iteratively relinearize the measurement equations to better deal with their nonlinearity, which, however, incurs a high computational cost. By choosing linearization points that preserve the system's observability properties, an EKF-based system can attain better accuracy than iterative-minimization methods, at only a fraction of the computational cost. Specifically, the system can use a unique estimate of certain states, such as, for example, the first available estimate, in order to compute the linearization matrices (i.e., the Jacobians) for all measurement equations that involve each of the states. Optionally, the estimates of one or more than one state can be used to compute the linearization matrices (i.e., the Jacobians) can be modified by equal amounts, to reduce linearization inaccuracy while preserving the system's observability properties.

Within the class of EKF methods, there are two possible formulations of the estimator. Specifically, the system can employ the EKF-SLAM approach, where the state vector contains a current IMU state as well as feature positions. To keep the computations bounded, features that leave the field of view can be removed from the state vector, leaving only the currently observed ones. Other EKF algorithms maintain a sliding window of camera poses in the state vector, and use the feature observations to apply probabilistic constraints between these poses. In a preferred embodiment, the system uses a multistate-constraint Kalman filter (MSCKF) algorithm that uses the all the information provided by the feature measurements.

Both the MSCKF and EKF-SLAM use exactly the same information, and only differ in the way they organize the computations, and in linearization. If the measurement models were linear, both methods would yield exactly the same result, equal to the maximum-a-posteriori (MAP) estimate of the IMU pose. With respect to computational cost, however, the two methods differ substantially. For the EKF-SLAM algorithm the cost at each time-step is cubic in the number of features, since all features in the state vector are observed. In contrast, the MSCKF has computational cost that scales linearly in the number of features, but cubically in the length of the feature tracks. Therefore, if many features are tracked, each in a small number of frames, the MSCKF approach is preferable, but if few features are tracked over long image sequences, EKF-SLAM would result in lower computational cost. The system can integrate both EKF-SLAM and the MSCKF algorithms in a single, hybrid filter due to their complementary nature.

The system uses a modified MSCKF algorithm that attains increased accuracy and consistency by choosing linearization points that ensure the correct observability properties. The MSCKF does not include the feature positions in the state vector, but instead uses the feature measurements to directly impose constraints between the camera poses. The state vector of the MSCKF is:

$$x_k^T = [x_{I_k}^T\ x_{C_1}^T\ x_{C_2}^T\ \ldots\ x_{C_m}^T]T \quad \text{(Eq. 1)}$$

where $x_{I_k}$ is the current IMU state, and $x_{C_i}$, $i=1\ \ldots\ m$ are the camera poses (positions and orientations) at the times the last m images were recorded. The IMU state is defined as:

$$x_I = [\bar{q}^T\ p^T\ v^T\ b_g^T\ b_a^T]T \quad \text{(Eq. 2)}$$

where q is the unit quaternion describing the rotation from the global frame to the IMU frame, p and v denote the IMU position and velocity, respectively, while $b_g$ and $b_a$ are the gyroscope and accelerometer biases.

The MSCKF uses the IMU measurements to propagate the current IMU state and the covariance matrix, $P_{k+1|k}$, while the feature measurements are used for EKF updates. Let's assume that the i-th feature, that has been observed in l images, has just been lost from tracking (e.g., it went out of the field of view). At this time, the MSCKF method uses all the measurements of the feature to carry out an EKF update. Let the observations of the feature be described by the nonlinear equations $z_{ij} = h(x_{C_j}, f_i) + n_{ij}$, for $j=1\ \ldots\ l$, where $f_i$ is the feature position (described by the inverse-depth parameterization) and $n_{ij}$ is the noise vector, modeled as zero-mean Gaussian with covariance matrix $\sigma^2 I_2$. Using all the measurements we compute a feature position estimate $\hat{f}_i$, and then compute the residuals $\tilde{z}_{ij}=z_{ij}-h(\hat{x}_{C_j},\hat{f}_i)$, j=1 ... l. By linearizing, these residuals can be written as:

$$\tilde{z}_{ij} \simeq H_{ij}\tilde{x}_{C_j}+H_{f_{ij}}\tilde{f}_i+n_{ij}, j+1 \ldots l \quad (\text{Eq. 3})$$

where $\tilde{z}_{ij}$ and $\hat{f}_i$ are the estimation errors of the j-th camera pose and i-th feature respectively, and the matrices $H_{ij}$ and $H_{f_{ij}}$ are the corresponding Jacobians. Since the feature is not included in the MSCKF state vector, we proceed to marginalize it out. For this purpose, the system first forms the vector containing the l residuals from all the feature's measurements:

$$\tilde{z}_i \simeq H_i\tilde{x}+H_{f_i}\tilde{f}_i+n_i \quad (\text{Eq. 4})$$

where $\tilde{z}_i$ and $n_i$ are block vectors with elements $\tilde{z}_{ij}$ and $n_{ij}$, respectively, and $H_i$ and $H_{f_i}$ are matrices with block rows $H_{ij}$ and $H_{f_{ij}}$, for j=1 ... l. Subsequently, we define the residual vector $\tilde{z}_i^o = V^T\tilde{z}_i$, where V is a matrix whose columns form a basis of the left nullspace of $H_{f_i}$. From (Eq. 4), we obtain:

$$z_i^o = V^T\tilde{z}_i \simeq V^TH_i\tilde{x}+V^Tn_i = H_i^o\tilde{x}+n_i^o \quad (\text{Eq. 5})$$

Once $\tilde{z}_i^o$ and $H_i^o$ available, we proceed to carry out a Mahalanobis gating test for the residual $\tilde{z}_i^o$, by computing:

$$\gamma = (\tilde{z}_i^o)^T(H_i^oP_{k+1|k}(H_i^o)^T+\sigma^2 I)^{-1}\tilde{z}_i^o \quad (\text{Eq. 6})$$

and comparing it against a threshold computed based on the $\chi^2$ distribution with 2 l-3 degrees of freedom. By stacking together the residuals of all features that pass this gating test, we obtain:

$$\tilde{z}^o = H^o\tilde{x}+n^o \quad (\text{Eq. 7})$$

where $\tilde{z}^o$, $H^o$, and $n^o$ are block vectors/matrices, with block rows $\tilde{z}_i^o$, $H_i^o$, and $n_i$ for i=1 ... n, respectively. We can now use the above residual, which only involves the camera poses, for an EKF update. However, if a large number of features are processed at each time instant (the common situation), further computational savings can be achieved. Specifically, instead of using the above residual, we can equivalently compute the thin QR factorization of $H^o$, written as $H^o = Q H^r$, and then employ the residual $\tilde{z}^r$ for updates, defined as:

$$\tilde{z}^r = Q^T\tilde{z}^o = H^r\tilde{x}+n^r \quad (\text{Eq. 8})$$

where $n^r$ is the r×1 noise vector, with covariance matrix $\sigma^2 I_r$. Once the residual $\tilde{z}^r$ and the matrix $H^r$ have been computed, we compute the state correction and update the covariance matrix via the standard EKF equations:

$$\Delta x = K\tilde{z}^r \quad (\text{Eq. 9})$$

$$P_{k+1|k+1} = P_{k+1|k} - KSK^T \quad (\text{Eq. 10})$$

$$S = H^rP_{k+1|k}(H^r)^T+\sigma^2 I_r \quad (\text{Eq. 11})$$

$$K = P_{k+1|k}(H^r)^T S^{-1} \quad (\text{Eq. 12})$$

The above-described method of processing feature measurements is optimal, in the sense that no approximations are used, except for the EKF's linearization. This is true, however, only if the sliding window of states, m, contains at least as many states as the longest feature track. If it does not, then the measurements that occurred more than m timesteps in the past cannot be processed. Therefore, to use all the available feature information, the MSCKF must maintain a window of states long enough to include the longest feature tracks.

The computation time of the MSCKF is dominated by the following operations:

1) The Mahalanobis test for each feature, requiring $$O\left(\sum_{i=1}^n l_i^2\right)$$

operations.

2) The computation of the residual and the Jacobian matrix in (Eq. 8), which, by exploiting the structure in $H^o$, can be implemented in approximately $$O\left(\sum_{i=1}^n l_i^3\right)$$

operations.

3) The computation of the Kalman gain and the update of the covariance matrix, which require $O(r^3/6+r(15+6m)^2)$ operations. Here 15+6m is the size of the state covariance matrix, and r is the number of rows of $H^r$. It can be shown that, in general, r (which equals the number of independent constraints for the camera poses) is given by:

$$r = 2(l_{(1)}+l_{(2)}+l_{(3)})-7 \quad (\text{Eq. 13})$$

where $l_{(1)}$, $l_{(2)}$, $l_{(3)}$ are the three longest feature tracks. Although the computational cost of the MSCKF is linear in the number of features, it is at least quadratic in the size of the sliding window, m. In fact, if the size of the sliding window is chosen to be equal to the longest feature tracks, then r is also O(m), and the overall complexity becomes cubic in m. This demonstrates a shortcoming of the MSCKF for preserving all measurement information: the complexity of the algorithm scales cubically as a function of the longest feature track length.

In real-world datasets the distribution of the feature-track lengths is non-uniform, with many features tracked for short durations, and very few stable features tracked over longer periods. For example, FIG. 1 shows the distribution of the feature track lengths in two parts of a real-world dataset. As can be seen, even though the longest feature tracks reach 40 images, the vast majority of features are tracked for a small number of frames. The percentage of features tracked in five or less images is 88% and 69% in the two cases shown, respectively. To be able to process the small percentage of features with long track lengths, the MSCKF must maintain a long sliding window. This, however, is computationally inefficient. Therefore, the system integrates the MSCKF algorithm with EKF-SLAM, to address this limitation.

Alternatively, the system can process feature measurements using the EKF by including the feature measurements in a state vector, and using the observations as in the standard visual-SLAM formulation. As discussed earlier, this approach has computational properties complementary to those of the MSCKF. While the MSCKF is better at processing many features tracked for a few frames, EKF-SLAM is faster when few features are tracked for many frames. The system combines both approaches in a single, "hybrid" estimator. Specifically, the system uses a filter whose state vector at time-step k contains the current IMU state, a sliding window of m camera poses, and $s_k$ features:

$$x_k = [x_{I_k}^T x_{C_1}^T \ldots x_{C_m}^T f_1^T \ldots f_{s_k}^T]^T \quad (\text{Eq. 14})$$

This provides the system with the ability to determine whether a feature will be processed using the MSCKF approach, or whether it will be included in the state vector and processed as in EKF-SLAM. By analyzing in detail the computational requirements of each EKF update, it can be shown that when many features are present there is no gain to initializing the state vector if any feature is observed fewer than m times. Thus, in one embodiment of the system the strategy for using the features is as follows: if feature i's track is lost after fewer than m frames (i.e., $l_i$<m), then the feature is processed using the MSCKF equations, as described. If a feature is still actively being tracked after m images, it is initialized into the state vector, and used for the described SLAM computation. Therefore, the system can determine the size of the sliding window, m.

At a given time step, the EKF update is carried out using a residual vector constructed by stacking together the residual computed from a number of "MSCKF features" and from a number $s_k$ of observations of "SLAM features":

$$\tilde{z}_k = \begin{bmatrix} \tilde{z}_k^r \\ \tilde{z}_{1m} \\ \vdots \\ \tilde{z}_{s_k m} \end{bmatrix} \simeq \begin{bmatrix} H^r \\ H_{1m} \\ \vdots \\ H_{s_k m} \end{bmatrix} \tilde{x}_k + n_k = H_k \tilde{x}_k + n_k \quad \text{(Eq. 15)}$$

In the above equation, $\tilde{z}_{jm}$, for j=1 . . . $s_k$ are the residuals of the observations of the SLAM features from the latest camera state (state m), and $H_{jm}$, for j=1 . . . $s_k$ are the associated Jacobian matrices. Each of these residuals is a 2×1 vector, while each $H_{jm}$ is a 2×(15+6m+3 $s_k$) matrix (here 15+6m+3$s_k$ is the size of the state covariance matrix). The residual $\tilde{z}_k$ and the Jacobian $H_k$ are used for updating the state and covariance matrix.

For initializing new features, the m measurements of a feature are used to triangulate it and to compute its initial covariance and the cross-correlation with other filter states. In our implementation, we use the inverse-depth feature parameterization, due to its superior linearity properties. The latest camera clone, $x_{C_m}$, is used as the "anchor" state, based on which the inverse-depth parameters are computed. If the feature is still actively being tracked at the time its anchor state needs to be removed from the sliding window, the anchor is changed to the most recent camera state, and the covariance matrix of the filter is appropriately modified. The hybrid MSCKF/SLAM algorithm is described in Algorithm 1.

Algorithm 1 Hybrid MSCKF/SLAM Algorithm
Propagation: Propagate the state vector and covariance matrix using the IMU readings. Once camera measurements become available:
  Augment the state vector with the latest camera pose.
  For features to be processed in the MSCKF (feature tracks of length smaller than m), do the following:
    For each feature to be processed, calculate the residual and Jacobian matrix in (Eq. 5).
    Perform the Mahalanobis gating test in (Eq. 6).
    Using all features that passed the gating test, form the residual vector and the Jacobian matrix in (Eq. 8).
  For features that are included in the state vector, compute the residuals and measurement Jacobian matrices, and form the residual $\tilde{z}_k$ and matrix $H_k$ in (Eq. 15).
  Update the state vector and covariance matrix, via (Eq. 9)-(Eq. 12), using the residual $\tilde{z}_k$ and Jacobian matrix $H_k$.
  Initialize features tracked in all m images of the sliding window.
State Management:
  Remove SLAM features that are no longer tracked, and change the anchor pose for SLAM features anchored at the oldest pose.
  Remove the oldest camera pose from the state vector. If no feature is currently tracked for more than $m_o$ poses (with $m_o$<m−1), remove the oldest m−$m_o$ poses.

The system can select the size of the sliding window, m, to reduce the computational cost of the hybrid MSCKF/SLAM filter. The choice of m can have a profound effect on the time requirements of the algorithm. With a suitable choice, the hybrid method can significantly outperform each of its individual components.

By carefully analyzing the computations needed, the system can calculate the number of floating-point operations per update of the hybrid algorithm:

$$f_k = \alpha_1 \sum_{i=1}^{n} l_i^3 + \alpha_2 (r + 2s_k)^3 + \alpha_3 (r + 2s_k)(15 + 6m + 3s_k)^2 + l.o.t \quad \text{(Eq. 16)}$$

where the $\alpha_i$'s are known constants, n is the number of features used in the MSCKF, r is defined in (13), and l.o.t. stands for lower-order terms. The full expression for the operation count consists of tens of individual terms, whose inclusion would merely complicate the description and not add much insight. The three terms shown above correspond to the computation of the MSCKF residual, the Cholesky factorization of the matrix S in (Eq. 12), and the covariance update equation, respectively. Note that (Eq. 16) also models the probability of failure for the Mahalanobis test.

It is interesting to examine the properties of (Eq. 16). First, note that since r represents the number of constraints provided by the MSCKF features for the poses in the sliding window, it is bounded above by 6m−7: the total number of unknowns in the sliding window is 6m, and the feature measurements cannot provide any information about the global pose or scale, which correspond to 7 degrees of freedom. If many features are available, the system will have r≈6m−7, and thus:

$$f_k \approx \alpha_1 \sum_{i=1}^{n} l_i^3 + \alpha_2 (6m + 2s_k - 7)^3 + \quad \text{(Eq. 17)}$$
$$\alpha_3 (6m + 2s_k - 7)(15 + 6m + 3s_k)^2$$

Figure 3A:
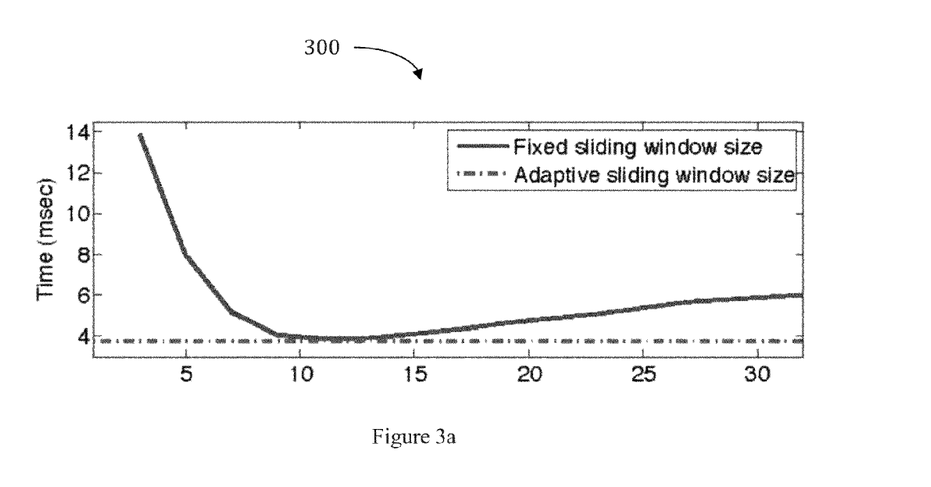
FIGS. 3a and 3b are diagrams showing the results of a Monte-Carlo simulation comparing timing performance on a laptop computer and root mean square position accuracy of a hybrid filter, for changing values of m on a laptop computer.
Figure 3B:
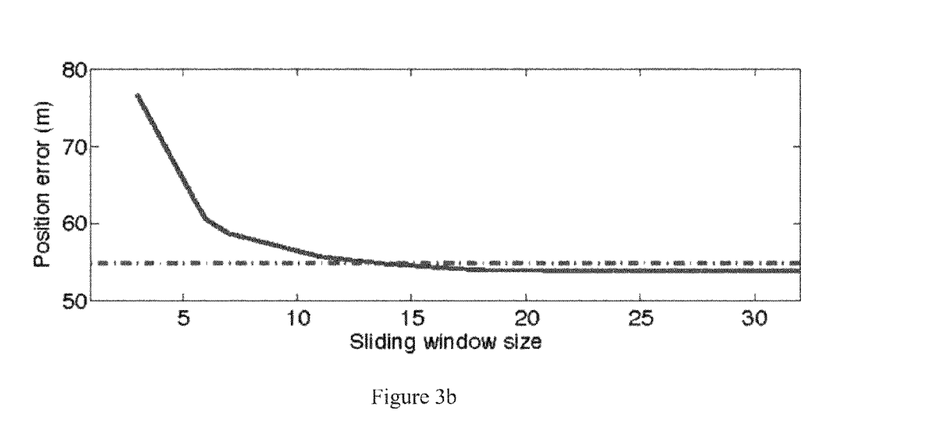

This approximate expression makes it possible to gain intuition about the behavior of the computational cost of the hybrid method: as the size of the sliding window, m, increases, more features will be processed by the MSCKF, and fewer features will be included in the state vector of the filter. Thus, as m increases, the term $$\sum_{i=1}^{n} l_i^3$$

will increase, but $s_k$ will decrease rapidly. These two opposing trends result in the performance curves shown in FIGS. 3a and 3b.

In one embodiment, the system determines, in real time, the optimal value of m in order to minimize the runtime of the hybrid EKF estimator. Equation 16 provides the operation count of one filter update, so at first glance, it may appear that the system would need to minimize this equation with respect to m, at each time instant. However, that would be an ill-posed problem. To see why, consider the case where, at time step k, the sliding window has length m=20, and ten features exist that have been continuously tracked in 20 images. At this time, the system can either increase the size of the sliding window, or include the ten features in the state vector. Which is best depends on the future behavior of the feature tracks. If the features end up being tracked for a very large number of frames ($\gg 20$), then it would be preferable to include the features in the state vector. If, on the other hand, the features end up being tracked for only 21 frames, it would be preferable to increase m by one.

Clearly, it is impossible to obtain future information about any particular feature track. The system can however, collect statistical information about the properties of the feature tracks, and use this information to minimize the expected cost of the EKF updates. This approach is implemented in one embodiment of the system. Specifically, during the filter's operation, the system collects statistics to learn the probability mass function (pmf) of the feature track lengths, the probability of failure of the Mahalanobis gating test, as well as the pmf of the number of features tracked in the images. Using the learned pmfs, the system computes the average number of operations needed for each EKF update, $\bar{f}(m)$, by direct application of the definition of the expected value of a function of random variables.

The value of m that yields the minimum $\bar{f}(m)$ can be found by exhaustive search among all possible values. However, the cost curve in many practical cases is quasiconvex, which means that it has a unique minimum 200. Therefore, to reduce the time needed for the optimization, the system can perform the optimization by local search starting from a known good initial guess (e.g., the last computed value of m). Since the statistical properties of the feature tracks can change over time (see FIG. 1), the system can perform the learning of the pmfs as well as the selection of m, in consecutive time windows spanning a few seconds (15 sec in one implementation).

Figure 2:
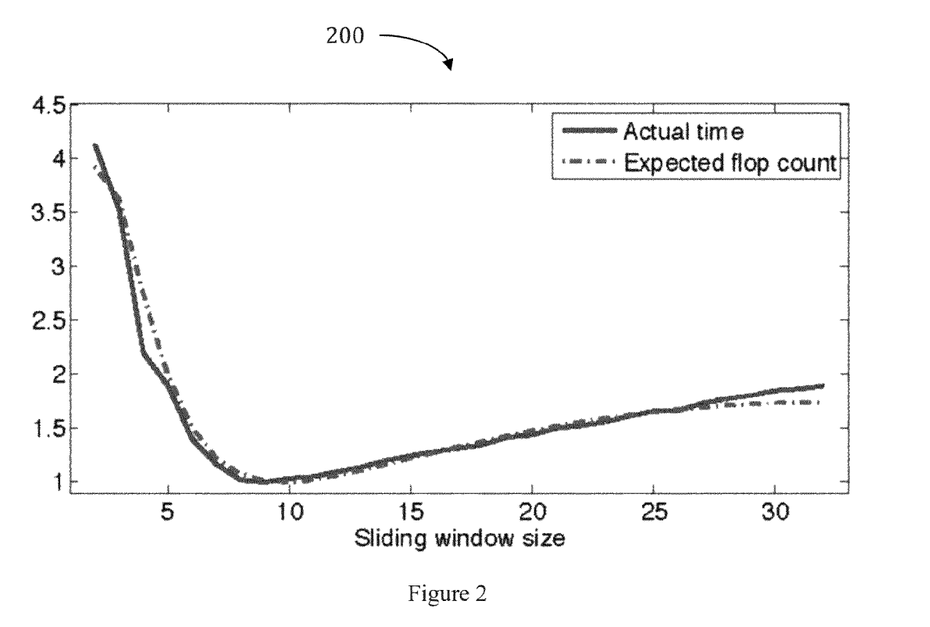
FIG. 2 is a diagram showing a comparison of actual runtime versus floating point operations of the system.

It is worth noting that in modern computers the use of flop counts to model computational cost is not always suitable, as performance is affected by several factors including vectorization, cache access patterns, data locality, etc. However, it has been experimentally verified that in the algorithms considered here, and for our implementation, the computed flop counts closely follow the observed runtimes. Specifically, FIG. 2 shows the actual runtime of the hybrid filter, as well as the value $\bar{f}(m)$ calculated analytically, for a specific trajectory. As can be observed, the two curves are very similar, with the only significant differences observed at the two "extremes" of very small or very large m. These regions are less important, however, as they fall outside the typical operational region of the hybrid filter. Thus, using $\bar{f}(m)$ as the objective function to minimize is appropriate.

To test the system simulation data was generated that closely matched real-world datasets, to have as realistic a test environment as possible. A first simulation environment is based on a dataset that consists of a 29.6-km long trajectory through canyons, forested areas, and a town. A ground truth trajectory (position, velocity, orientation) was generated that matches the vehicle's actual trajectory, as computed by a high-precision INS system. Using this trajectory, IMU measurements corrupted with noise and bias characteristics identical to those of the Xsens MTi-G sensor used in the dataset were subsequently generated. Moreover, monocular feature tracks with statistical characteristics similar to those of the features extracted in the actual dataset were also generated. The number of features observed in each image and the feature track distribution change in each part of the trajectory, as in the actual dataset (see FIG. 1). Overall, there are 232 features observed in each image on average, and the average feature track length is 5.6 frames. The IMU measurements are available at 100 Hz, while the camera frame rate is 20 Hz. All the results reported are averages over 50 Monte-Carlo trials.

Referring now to FIGS. 3a and 3b, there are diagrams 300 showing the results of a Monte-Carlo simulation comparing timing performance on a laptop computer and root mean square position accuracy of a hybrid filter, for changing values of m. Specifically, FIG. 3a shows the average runtime for each update of the hybrid algorithm. The solid blue line is the average time when the threshold m is chosen in advance, and kept constant for the entire trajectory. The red dashed line denotes the runtime achieved when applying an optimization process that chooses the threshold in each time window, to adapt to local feature properties. This plot shows that, by optimizing the value of m in real time, we can attain performance higher than that of any fixed threshold. Note that when m is large, no features are initialized, and thus the right-most part of the plot gives the performance of the plain MSCKF (similarly, for small m we obtain pure EKF-SLAM). Therefore, from this plot we can see that the optimal hybrid filter has a runtime 37.17% smaller than that of the MSCKF, and 72.8% smaller than EKF-SLAM.

In the second subplot FIG. 3b there is a plot of the RMS position error, averaged over all Monte-Carlo trials and over the duration of the trajectory. As can be seen, the plain MSCKF results in the highest accuracy. This can be attributed to two causes. First, in the MSCKF features are explicitly marginalized, and thus no Gaussianity assumptions are needed for the pdf of the feature position errors (as is the case in SLAM). Second, all the measurements of each feature are used jointly in the MSCKF, which means that outliers can be more easily detected, and better linearization points can be computed. By combining the MSCKF with EKF-SLAM some accuracy can be lost, as the errors for the features included in the state vector are now assumed to be Gaussian. However, as can be seen, if the size of the sliding window increases above a moderate value (e.g., 9 in this case), the change in the accuracy is almost negligible. Intuitively, when a sufficient number of observations are used to initialize features, the feature errors' pdf becomes "Gaussian enough" and the accuracy of the hybrid filter is very close to that of the MSCKF. Based on these results, the system does not allow the value of m to fall below a certain threshold. In a preferred embodiment, the value of m is set to 7.

The timing results presented in FIGS. 3a and 3b were obtained on a laptop computer with a Core i7 processor at 2.13 GHz, and a single-threaded C++ implementation. Clearly, if the data were to be processed on this computer, the timing performance would easily allow for real-time implementation (the hybrid filter requires fewer than 4 msec per update with optimal m). However, our primary interest is in implementing pose estimation on small portable devices. For this reason, we conducted a second set of tests, in which the data were processed on a Samsung Galaxy S2 mobile phone, equipped with a 1.2-GHz Exynos 4210 processor. For these tests, we ported our C++ implementation to Android using the Android NDK. The simulation data were produced in a similar way as described above, by emulating a real-world dataset collected while driving in a residential area of Riverside, Calif. The vehicle trajectory and statistics of the dataset (e.g., feature distribution, feature track length, and so on) are different, allowing us to test the proposed algorithm in different situations.

Figure 4A:
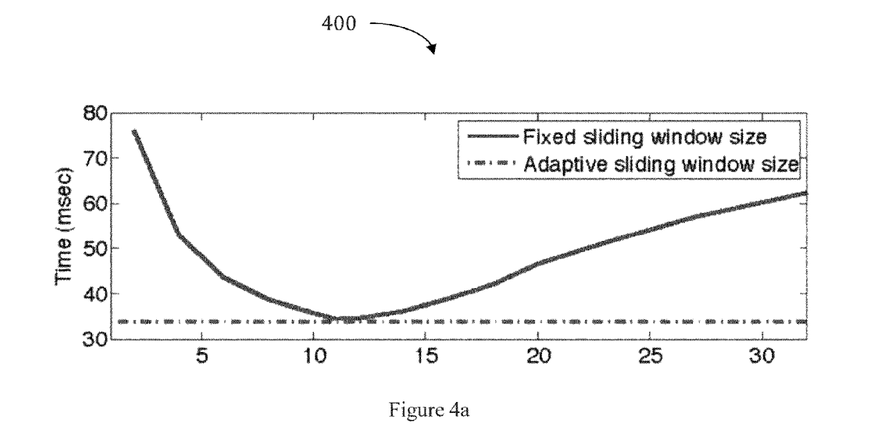
FIGS. 4a and 4b are diagrams showing of a Monte-Carlo simulation comparing timing performance and root mean square position accuracy of the hybrid filter, for changing values of m on a mobile phone using a different data set than used in the simulation of FIG. 3.
Figure 4B:
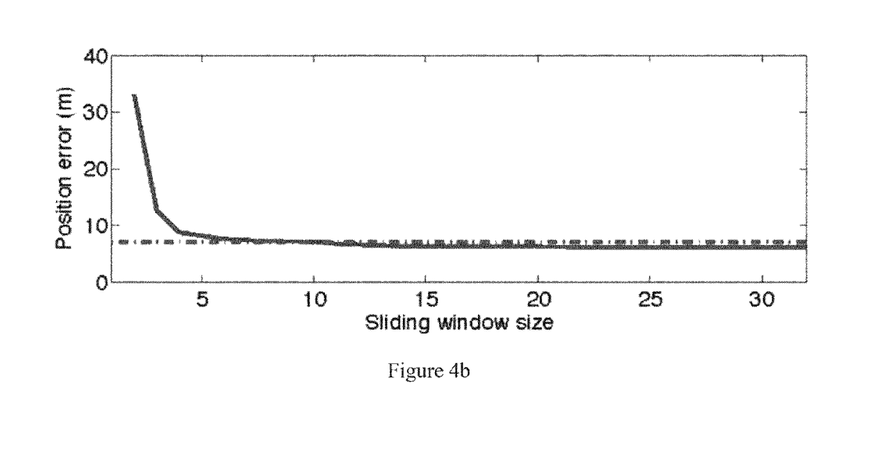

Referring now to FIGS. 4a and 4b, there are shown diagrams 400 showing of a Monte-Carlo simulation comparing timing performance and root mean square position accuracy of the hybrid filter, for changing values of m on a mobile phone using a different data set than used in the simulation of FIG. 3. FIG. 4a shows the results of the hybrid filter in this setting. These results are very similar to what was observed in the first simulation, with the optimal hybrid filter outperforming each of the individual algorithms by a wide margin (runtime 45.8% smaller than the MSCKF, and 55.6% smaller than SLAM). More importantly, however, we observe that the hybrid filter is capable of processing the data at real-time speeds, even on the much less capable processor of the mobile phone. Specifically, the average time needed for each update of the hybrid filter with optimally chosen thresholds is 33.78 msec, corresponding to a rate of 30 images per second. Since the images are recorded at 20 Hz, this means that the proposed hybrid estimator is capable of real-time processing, something that is not possible with the any of the individual methods.

Figure 5:
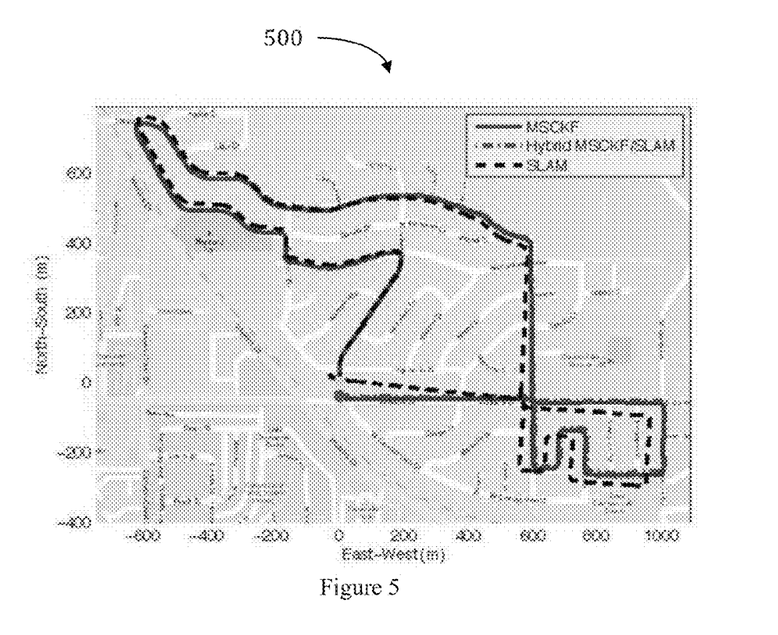
FIG. 5 is a map showing the trajectory estimates of MSCKF, EKF-SLAM, and the hybrid algorithm in the real-world example.

Referring now to FIG. 5, there is shown a map 500 showing the trajectory estimates of MSCKF, EKF-SLAM, and the hybrid algorithm in the real-world example. In addition to the synthetic datasets described above, we employed our proposed algorithm for processing the feature measurements recorded during a real-world experiment. During this experiment an IMU/camera platform was mounted on top of a car and driven on city streets. The sensors consisted of an Inertial Science ISIS IMU and a PointGrey Bumblebee2 stereo pair (only a single camera's images are used). The IMU provides measurements at 100 Hz, while the camera images were stored at 10 Hz. Harris feature points are extracted, and matching is carried out by normalized cross-correlation. The vehicle trajectory is approximately 5.5 km long, and a total of 7922 images are processed.

In this dataset, to compensate for the low frame rate of the images, we use lower feature-detection thresholds, which leads to a larger number of features. Specifically, 540 features are tracked in each image on average, and the average track length is 5.06 frames. This substantially increases the overall computational requirements of all algorithms. When run on the mobile phone's processor, the average time per update is 139 msec for the MSCKF, 774 msec for EKF-SLAM, and 77 msec for the hybrid filter with optimally selected thresholds. The trajectory estimates 500 for each of the three methods are plotted on a map of the area where the experiment took place. We observe that the accuracy of the MSKCF and the hybrid filter are similar, and substantially better than that of the EKF-SLAM.

Figure 6:
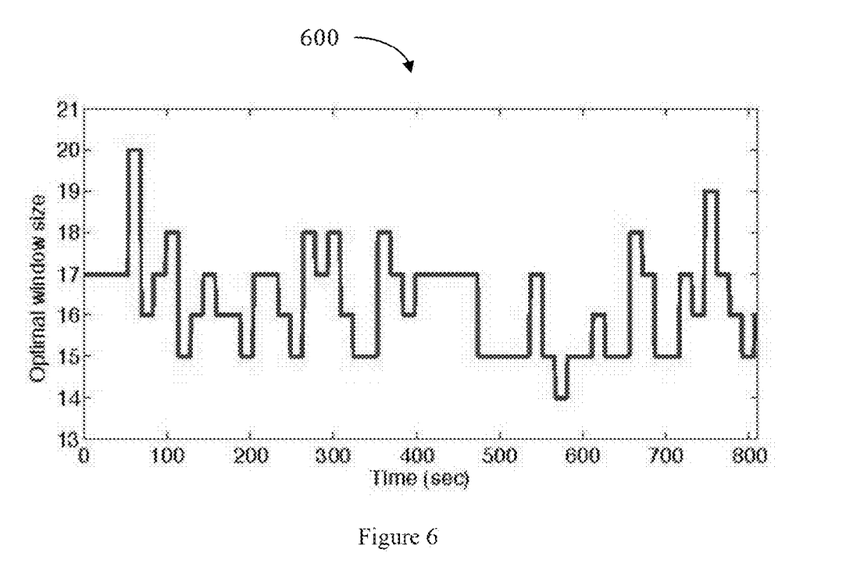
FIG. 6 is a chart showing thresholds selected using the optimization process for the real-world data set of FIG. 5.

Referring now to FIG. 6, there is shown a chart 600 showing thresholds selected using the optimization process for the real-world data set of FIG. 5. As can be seen in FIG. 6, there is a plot of the computed values for the optimal m during the experiment. This figure shows that, due to the changing properties of the feature tracks' distribution, the optimal value varies considerably over time, justifying the need for periodic re-optimization in this embodiment. As a final remark, it is noted that the optimization process itself is computationally inexpensive. In one embodiment, the optimal threshold is re-computed every 15 sec, and this process takes 0.31 msec, on average, on the mobile phone. Therefore, the optimization takes up less than 0.003% of the overall processing time, while resulting in substantial performance gains.

Figure 7:
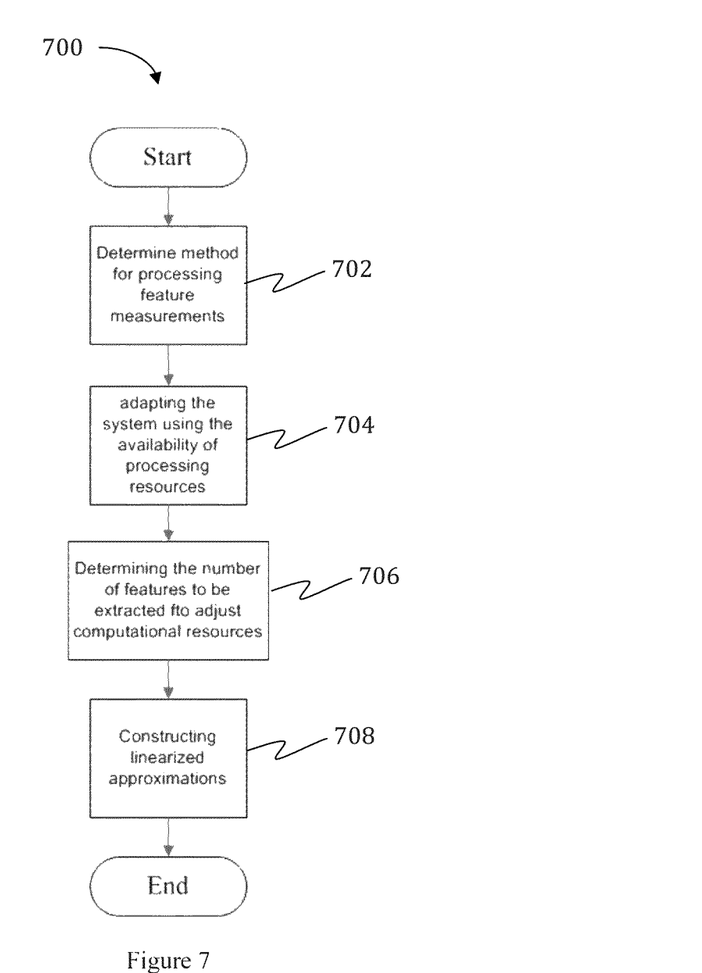
FIG. 7 is a flowchart diagram of some steps of a method for using a hybrid estimator using visual and inertial sensors for real-time pose tracking on devices with limited processing power, according to one embodiment.

Referring now to FIG. 7, there is shown a flowchart diagram 700 of some steps of a method for using a hybrid estimator using visual and inertial sensors for real-time pose tracking on devices with limited processing power, according to one embodiment. First, a determination as to what a method is to be used by the system for processing each of the feature measurements is performed 702. Then, the system is adapted to the characteristics of the environment, the trajectory of the moving object, and the availability of processing resources 704. Next, a determination as to the number of features to be extracted from raw sensor data is made in order to adjust to the availability of computational resources 706. Finally, linearized approximations of the nonlinear mathematical models that describe the motion and the sensor measurements are constructed 708.

Figure 8:
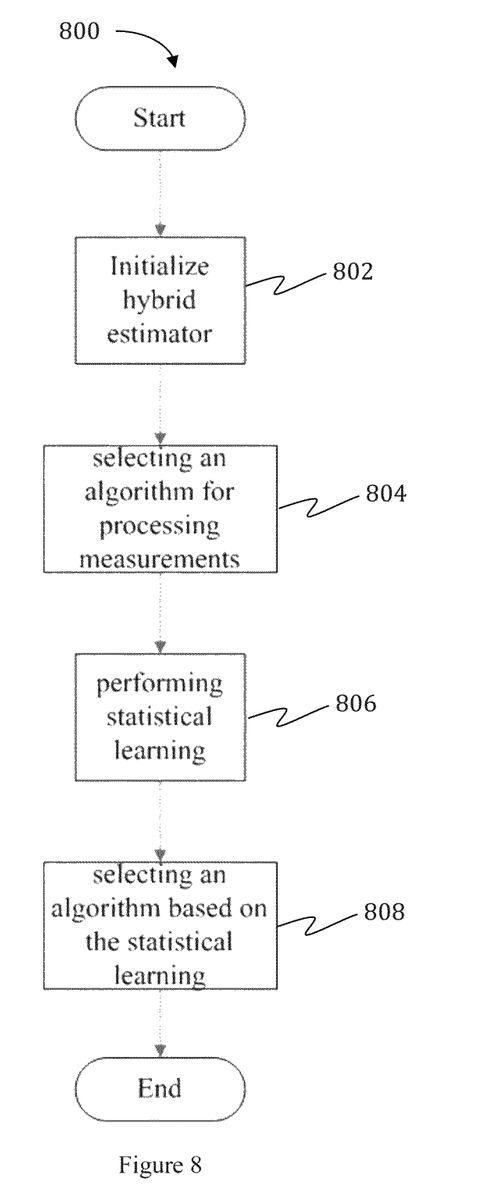
FIG. 8 is a flowchart diagram of some steps of a method for making a hybrid estimator using visual and inertial sensors for real-time pose tracking on devices with limited processing power, according to one embodiment.

Referring now to FIG. 8, there is shown a flowchart diagram 800 of some steps of a method for making a hybrid estimator using visual and inertial sensors for real-time pose tracking on devices with limited processing power, according to one embodiment. First, a device comprising at least one processor, a memory, a storage and communications through a protocol is provided. Then, one or more than one module, communicatively coupled to each other, comprising code executable on the processor is provided. Next, a hybrid estimator is initialized 802. Then, a real-time algorithm to process different measurements is selected 804. Next, statistical learning for these characteristics is performed to compute the expected device computing cost of any strategy for allocating measurements to algorithms 806. Finally, an algorithm is selected based on the statistical learning module 808.

Figure 9:
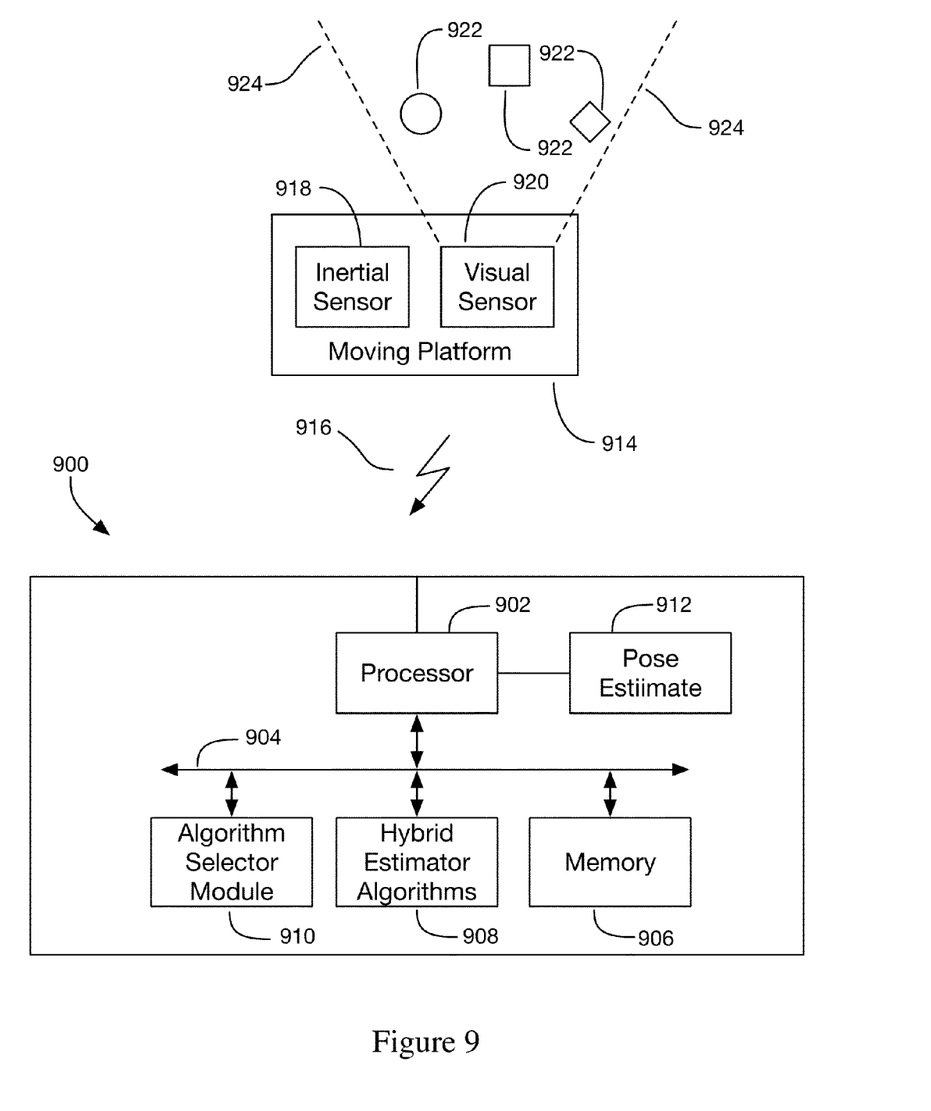
FIG. 9 is a block diagram showing an exemplary hybrid estimator system in accordance with the present invention.

Referring now to FIG. 9, a block diagram shows an exemplary hybrid estimator system 900 in accordance with the present invention. Hybrid estimator system 900 includes processor 902 coupled to bus 904 as is known in the art. Memory 906 is also coupled to bus 904. Block 908 stores a plurality of hybrid estimator algorithms as previously disclosed herein. Block 910 is an algorithm selector module that analyzes the inputs and other parameters in the manner disclosed herein and selects a hybrid estimator algorithm from block 908 to be used by processor 902. Moving platform 914 communicates with hybrid estimator system 900 via a communications protocol as indicated at arrow 916. Many communications protocols are known in the art and it is unnecessary to discuss them here. Moving platform 914 includes sensors such as inertial sensor 918 and visual sensor 920, e.g., a video camera that captures images of environmental features 922 within a field of view represented by dashed lines 924.

What has been described is a new hybrid estimator system using visual and inertial sensors for real-time pose tracking, overcoming limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

The invention claimed is:

1. A method for performing real-time pose tracking of a platform moving in an environment comprising:
    capturing data from at least an inertial sensor and a visual sensor on the moving platform, the data from the visual sensor including images;
    identifying in the data captured by the visual sensor a plurality of features in the environment and performing measurements on the identified features;
    estimating characteristics of the features from the measurements, including the number of images in which the features can be tracked;
    selecting from a plurality of algorithms an algorithm to be used for processing each of the measurements using the estimated characteristics of the features; and
    processing each of the measurements using the selected algorithm for that measurement to track the pose of the platform.

2. The method of claim 1 further comprising:
    selecting the algorithm based on the characteristics of the environment, the trajectory of the moving object, and the availability of processing resources; and
    adjusting the number of features to be extracted based on the availability of processing resources by determining the number of features to be extracted from raw sensor data.

3. The method of claim 1 wherein:
    a multistate-constraint Kalman filter is one of the plurality of algorithms for processing each of the feature measurements; and
    for each feature processed using the multistate-constraint Kalman filter algorithm, calculating a residual and Jacobian matrix for each feature to be processed, performing a Mahalanobis gating test, and forming a residual vector and a Jacobian matrix using all features that passed the Mahalanobis gating test.

4. The method of claim 1 further comprising:
    learning statistical characteristics of the feature measurements; and
    solving an optimization problem with an objective function representing an expected computation time to select the algorithm;
    computing in real time an expected computation time for processing measurements each of the plurality of algorithms to reduce the computational requirements; and
    selecting the algorithm to be used that has the lowest expected computation time for processing measurements.

5. The method of claim 1 wherein a state vector that includes the current IMU state, a number of previous platform poses, and a plurality of features is used for pose tracking.

6. The method of claim 5 further comprising reducing computation time by adjusting the number of previous platform poses in the state vector.

7. The method of claim 6, comprising:
    processing features having a track length smaller than the number, m, of previous platform poses in the state vector using a multistate-constraint Kalman filter algorithm; and
    processing features having a track length larger than m of previous platform poses in the state vector using an extended Kalman filter-simultaneous localization and mapping algorithm.

8. The method of claim 1, further comprising:
    employing within the algorithms linearized approximations of nonlinear mathematical models that describe motion and sensor measurements, wherein the linearized approximations utilize linearization matrices computed using a unique estimate of each platform position and velocity state to linearize all measurement equations.

9. The method of claim 1, further comprising:
    employing within the algorithms linearized approximations of nonlinear mathematical models that describe motion and sensor measurements, wherein the linearized approximations utilize linearization matrices computed using estimates of platform position states and feature positions that are modified so that their difference remains constant through time.

10. The method of claim 1, wherein the choice of algorithm to process each individual feature is made based on the distribution of the feature track lengths of features.

* * * * *